United States Patent [19]

Hekal

[11] Patent Number: 4,748,092
[45] Date of Patent: May 31, 1988

[54] FRAME FOR A CELL CONSTRUCTION
[75] Inventor: Ihab M. Hekal, Stamford, Conn.
[73] Assignee: Continental Can Company, Inc., Norwalk, Conn.
[21] Appl. No.: 78
[22] Filed: Jan. 2, 1987
[51] Int. Cl.⁴ .............................................. H01M 8/02
[52] U.S. Cl. ........................................ 429/35; 429/37; 204/253
[58] Field of Search ................ 429/34, 35, 37, 38, 429/39; 204/252, 253, 282

[56] References Cited
U.S. PATENT DOCUMENTS

| | | | |
|---|---|---|---|
| 3,278,336 | 10/1966 | Uline et al. | 429/35 |
| 3,378,480 | 4/1968 | Reinshagen et al. | 204/253 |
| 4,175,025 | 11/1979 | Creamer et al. | 204/253 |
| 4,274,939 | 6/1981 | Bjareklint | 429/39 |
| 4,455,209 | 6/1984 | Hermann | 204/282 |

Primary Examiner—Donald L. Walton
Attorney, Agent, or Firm—Charles E. Brown

[57] ABSTRACT

A frame and membrane assembly for a cell subject to fluid flow. The frame includes a peripheral portion having opposite faces which are to be sealed together. One of the faces is planar while the other of the faces is provided with a plurality of grooves. In an outermost groove there is a final sealing ring. An intermediate groove is generally dovetail shaped in cross section and the peripheral portion of a membrane is locked within that groove by a second sealing ring which deforms under pressure to increase the mechanical interlock while further forming an intermediate seal between two adjacent frames. A principal feature is an innermost groove in which there is seated a third sealing ring. The third sealing ring underlies the membrane and when two adjacent frames are brought together in the formation of a cell, the membrane is forced against the underlying sealing ring which deforms and resiliently clamps the membrane against the next adajcent frame so as to form an innermost seal.

14 Claims, 1 Drawing Sheet

FRAME FOR A CELL CONSTRUCTION

This invention relates in general to new and useful improvements in cell constructions, and more particularly to a frame for a cell construction.

Cells of the type including a plurality of frames with membranes clamped between two adjacent frames are well known. However, difficulties have been experienced in effectively assembling such cells and more particularly the positioning and clamping of the membrane between the adjacent frames while maintaining a good seal between the adjacent frames.

In one type of cell construction, an effective seal has been obtained between adjacent frames by utilizing a compressible sealing ring. However, the membranes must also be clamped between two adjacent frames and in the past in order to accomplish this, one of each pair of opposing frame surfaces is provided with projections which generally bite into the membrane and force the membrane against the other frame surface. It has been found that this arrangement has not been satisfactory for the positioning of a membrane and maintaining such membrane in that position.

In accordance with this invention, one frame surface of each of a pair of opposing frame surfaces is provided with a generally dovetailed cross sectional groove and associated with that groove is a second sealing ring. Thus when the two frame surfaces are clamped together, the outer sealing ring forms a positive seal preventing escape of liquid from between the two frames while the inner resilient sealing member is deformed so as to stretch the membrane within the dovetailed cross sectional groove and positively maintain the membrane in position.

In addition, the second sealing ring also serves to aid in forming a seal against the escape of liquid from between the two frames.

With the above and other objects in view that will hereinafter appear, the nature of the invention will be more clearly understood by reference to the following detailed description, the appended claims, and the several views illustrated in the accompanying drawing.

Figure 1:
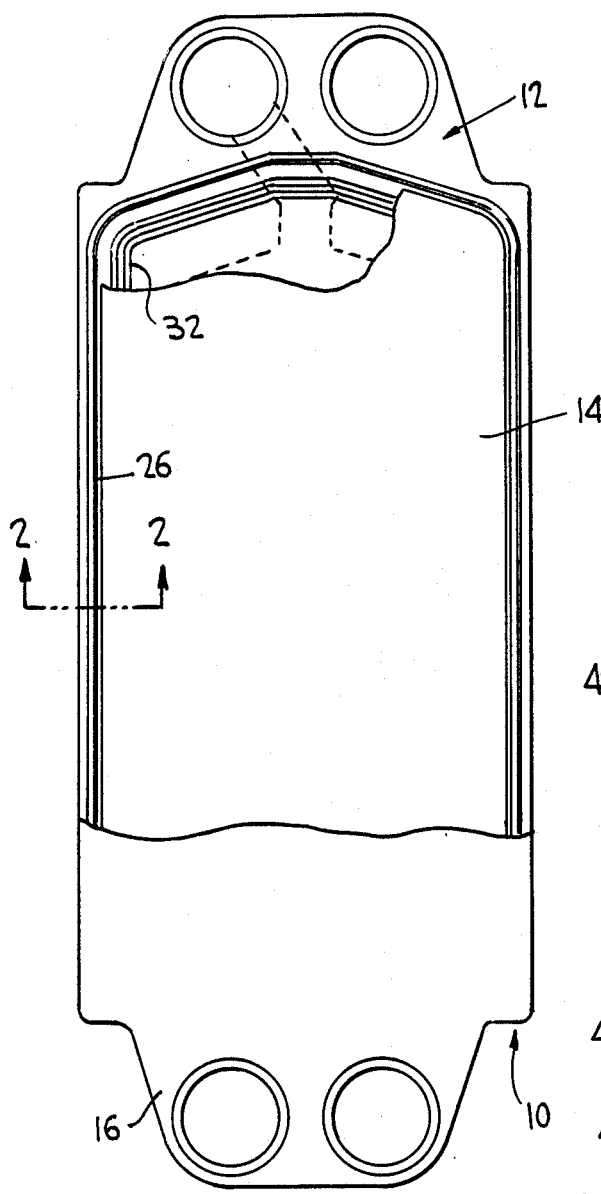
FIG. 1 is a prior art showing of a typical frame of an electrochemical cell between two of which a membrane is clamped in sealed relation.

Referring now to the drawings in detail, it will be seen that there is illustrated in FIG. 1 a known electrochemical cell generally identified by the numeral 10. The cell 10 is formed of a plurality of frames 12 with there being between adjacent frames 12 a membrane 14. Each cell 10 also includes an end plate 16. The end plate 16 and the frames 12 have conduit means therein for the inflow and outflow of liquids which are being treated. These, however, form no part of the invention.

Figure 2:
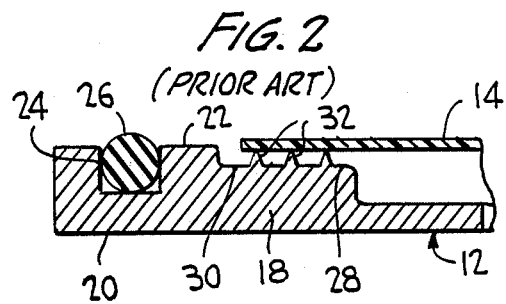
FIG. 2 is an enlarged fragmentary sectional view taken generally along the line 2—2 of FIG. 1 and it more specifically shows the prior art frame construction and the manner of positioning a membrane.

Referring now to FIG. 2, it will be seen that the known frame 12 has a peripheral joining portion 18 which includes a planar face 20 and a configured face 22. The configured face 22 includes a peripheral groove 24, which is rectangular in cross section. A resilient sealing ring 26 is sealed in the groove 24 for engagement with the planar surface 20 of a next adjacent frame 12.

The face 22, within the periphery of the groove 24, is provided with means 28 for anchoring the membrane 14. These means include a recessed area 30 having projecting therefrom generally pointed upstanding ribs 32.

Figure 3:
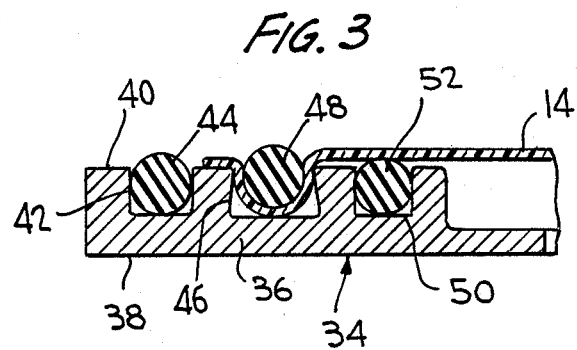
FIG. 3 is a sectional view similar to FIG. 2 and shows the frame and membrane retaining means which are the subject of this invention.

Reference is now made to FIG. 3 wherein there is illustrated a frame incorporating my invention, the frame being generally identified by the numeral 34. The frame 34 includes a peripheral portion 36 having at one face thereof a planar sealing surface 38 and at the opposite face thereof a sealing surface 40. This sealing surface is interrupted in several places.

First of all, there is an outer peripheral groove 42 which is rectangular in cross section and which carries a resilient sealing ring 44 that corresponds to the sealing ring 26.

Next inwardly of the groove 42 is a peripheral groove 46 which is dovetailed in cross section and which forms part of means for anchoring the membrane 14 relative to the frame 34. A peripheral portion of the membrane enters into and passes out of the groove 46 with the membrane 14 being initially interlocked with the frame 34 by means of a resilient sealing ring 38. The relative proportions of the groove 46 and the sealing ring 48 are such that an interlock between the membrane 14 and the frame 34 initially occurs. As will be described hereinafter, the relative sizes of the sealing rings 44, 48 is one wherein two adjacent frames 34 may be tightly clamped together with seals between the two adjacent plates being effected by both of the sealing rings 44, 48.

The means for anchoring the membrane 14 relative to the frame 34 is not part of my invention.

Most particularly, in accordance with my invention, the frame 34 is provided in the face 40 thereof with a third and innermost peripheral groove 50 which is generally rectangular in cross section and which receives a thrid and final resilient sealing ring 52. It is to be noted that the sealing ring 52 underlies the membrane 14. It is also to be noted that the sealing ring 52 projects out of the groove 50 so as to initially position the membrane 14 above the surface 40 of the frame 34.

Figure 4:
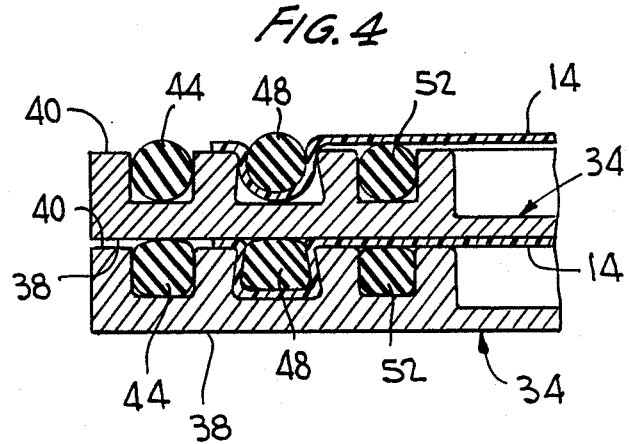
FIG. 4 is a sectional view similar to FIG. 3 showing two frames in clamped relation with respect to each other and to a membrane in accordance with the invention.

It is to be understood that the sealing ring 48 permits the membrane 14 to be assembled with the frame 34 in interlocking relation to the extent that the assembled membrane and frame may be readily handled as is required in assembling a plurality of the frames 34 and membranes 14 in the formation of the cell 10. Further, with reference to FIG. 4, it will be seen that when two frames 34 are clamped together, as occurs when the cell 10 is formed, the planar surface 38 of one frame 34 opposes the surface 40 of the next adjacent frame. The surface 38 remains spaced from the surface 40 of the next adjacent frame a distance at least as great as the compressed thickness of the membrane 14. However, each of the resilient sealing rings 44, 48 and 52 is compressed. The sealing ring 44 forms the ultimate outer seal between two adjacent frames 34. The sealing ring 48, by being deformed into the groove 46 increases the locking pressure on the membrane 14 and assures no movement of the membrane 14 relative to the frames 34 in the use of the cell 10. It further provides a seal between the two adjacent frames. Finally, there is a primary seal formed between the two adjacent frames 34 by the sealing ring 52. The membrane 14 is clamped between the sealing ring 52 and the surface 38 of the next adjacent frame 34. Not only does the sealing ring 52 tightly clamp the membrane 14 against the next adjacent frame 34, but it also forms a liquid tight seal between the two frames.

It has been found that the addition of the sealing ring 52 does have beneficial results as compared to the prior art structure which does not incorporate such a sealing ring.

Although only a preferred embodiment of a cell frame and membrane assembly has been illustrated and described, it is to be understood that minor variations may be made in the frame and the frame and membrane assembly without departing from the spirit and scope of the invention as defined by the appended claims.

I claim:

1. A frame for a cell construction wherein a membrane is clamped between adjacent frames and a seal is effected between the membrane and two adjacent frames, said frame having at least one peripheral face for receiving in contacting relation an outer peripheral portion of a membrane, said peripheral face having peripheral anchoring means for anchoring a membrane relative to said peripheral face, and pheripheral sealing means carried by said peripheral face within the periphery of said peripheral anchoring means.

2. A frame according to claim 1 wherein said peripheral sealing means includes a groove in said peripheral face and a resiliently deformable sealing member seated in said groove and projecting outwardly beyond said peripheral face.

3. A frame according to claim 2 wherein there are outer peripheral sealing means carried by said peripheral face radially outwardly of said peripheral means for forming a direct seal between adjacent frames.

4. A frame according to claim 3 wherein said outer peripheral sealing means includes a groove in said peripheral face and a resiliently deformable sealing member seated in said groove and projecting outwardly beyond said peripheral face.

5. A frame according to claim 1 wherein there are outer peripheral sealing means carried by said peripheral face radially outwardly of said peripheral means for forming a direct seal between adjacent frames.

6. A frame according to claim 5 wherein said anchoring means includes a further peripheral groove for receiving a peripheral portion of a membrane, and a rope-like member seated in said further peripheral groove for retaining a membrane peripheral portion in said further peripheral groove.

7. A frame according to claim 1 wherein said anchoring means includes a further peripheral groove for receiving a peripheral portion of a membrane, and a rope-like member seated in said further peripheral groove for retaining a membrane peripheral portion in said further peripheral groove.

8. A frame assembly for a cell construction wherein a membrane is clamped between adjacent frames and a seal is effected between the membrane and two adjacent frames, said frame assembly comprising a frame and a membrane, said frame having at least one peripheral face, said membrane extending across said frame and having an outer peripheral portion seated on said peripheral face, said peripheral face having peripheral anchoring means anchoring said membrane to said frame, and peripheral sealing means carried by said peripheral face within the periphery of said peripheral anchoring means.

9. An assembly according to claim 8 wherein said peripheral sealing means includes a groove in said peripheral face and a resiliently deformable sealing member sealed in said groove and projecting outwardly beyond said peripheral face.

10. An assembly according to claim 9 wherein there are outer peripheral sealing means carried by said peripheral face radially outwardly of said peripheral means for forming a direct seal between adjacent frames.

11. An assembly according to claim 10 wherein said outer peripheral sealing means includes a groove in said peripheral face and a resiliently deformable sealing member seated in said groove and projecting outwardly beyond said peripheral face.

12. An assembly according to claim 11 wherein said anchoring means includes a further peripheral groove for receiving a peripheral portion of a membrane, and a rope-like member seated in said further peripheral groove and retaining said membrane peripheral portion in said further peripheral groove.

13. An assembly according to claim 12 wherein said rope-like member is in the form of an O-ring.

14. An assembly according to claim 8 wherein said anchoring means includes a further peripheral groove for receiving a peripheral portion of a membrane, and a rope-like member seated in said further peripheral groove and retaining said membrane peripheral portion in said further peripheral groove.

* * * * *